Aug. 24, 1954     L. W. JONES     2,687,176
APPARATUS FOR CONDUCTING DRILL STEM TESTS
Filed July 21, 1950
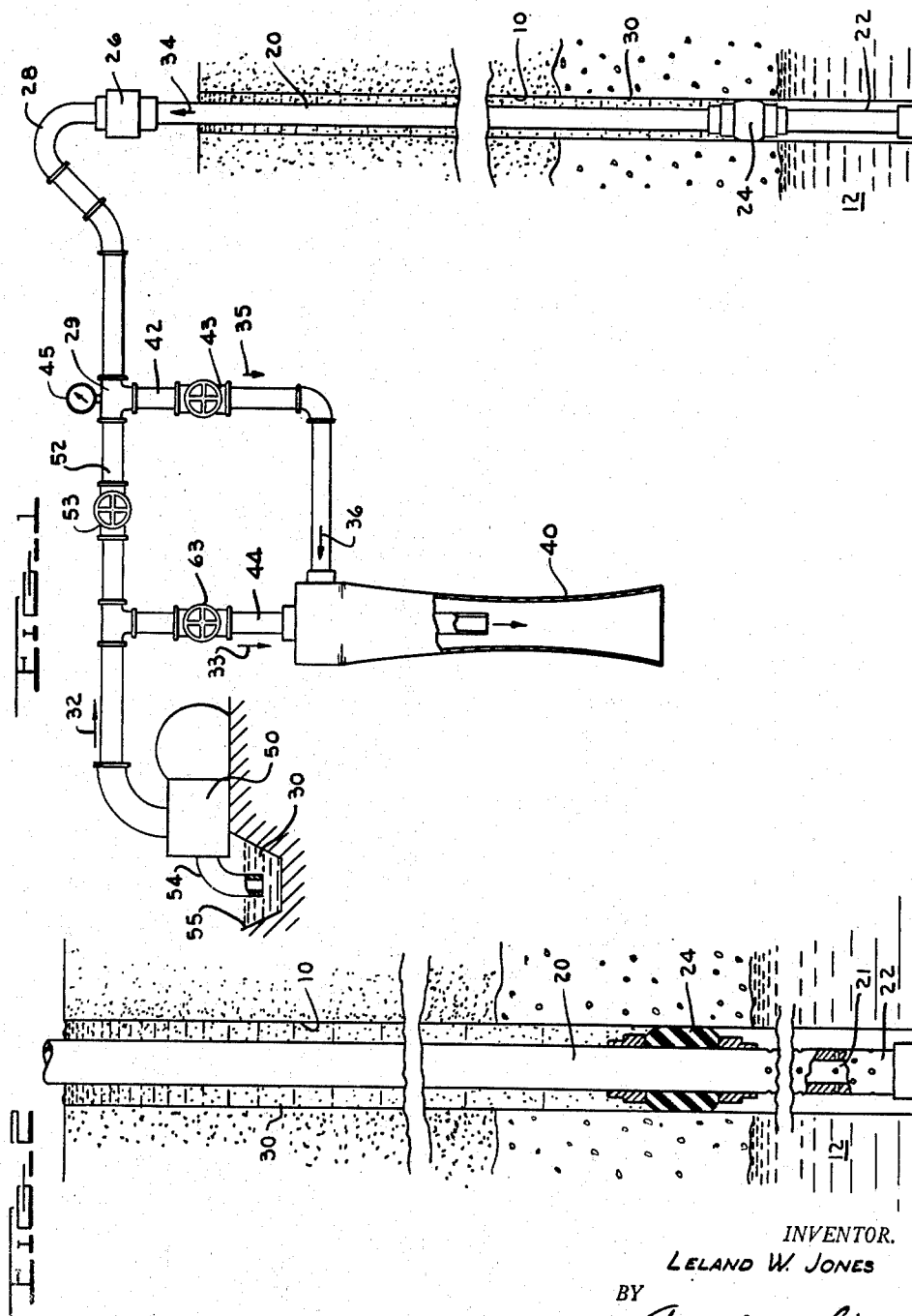
INVENTOR.
LELAND W. JONES
BY
ATTORNEY Patented Aug. 24, 1954

2,687,176

UNITED STATES PATENT OFFICE 2,687,176

APPARATUS FOR CONDUCTING DRILL STEM TESTS

Leland W. Jones, Edmond, Okla.

Application July 21, 1950, Serial No. 175,117

1 Claim. (Cl. 166—74)

This invention relates to apparatus for conducting drill stem tests and more particularly to apparatus for determining the possible productivity and capacity of a producing formation in an oil, gas or water well and with which accurate and dependable data may be obtained from wells having a relatively low bottom hole pressure.

In the testing of a formation for gas, oil or water subsequent to drilling of the well, a drill pipe is run into the well and a packer or seal is set on top of the formation under test to seal the annular space between the drill pipe and the walls of the well bore. In the conventional method of testing a well, the sample of the formation is then permitted to enter through a perforation provided in the lower portion of the drill pipe and the sample rises in the pipe to a height determined by the quantity of back pressure present in the formation.

However, in wells having a relatively low bottom hole pressure, the pressure exerted by the column of mud used in drilling the well is frequently greater than the pressure of the formation under test and the mud is thus forced back into the formation against such pressure. In testing such an oil well, quantities of slightly oily mud are frequently obtained in the samples, but such a test does not give conclusive information or data regarding the possible productivity or capacity of the formation under test.

It is, accordingly, an object of this invention to provide an apparatus for testing the possible productivity and capacity of a well, which apparatus is especially adapted to provide accurate and reliable data concerning the productivity of wells having a relatively low bottom hole pressure.

It is a further object of the invention to provide an apparatus of the above type which will permit an expulsion of infiltrated mud from the formation and allow the fluid contents from the formation to enter the drill pipe.

Another object of the invention is to provide an apparatus for testing relatively low pressure sands, which apparatus does not require special and costly equipment, but which instead is adapted to utilize conventional drilling equipment which is normally available at the well site during the testing operation.

Other objects of this invention will appear in the following description and appended claim, reference being had to the accompanying drawings forming a part of this specification wherein like reference characters designate corresponding parts in the several views.

In the drawings:

Fig. 1 is a schematic front elevation, partly in section, of an apparatus for carrying out the method of conducting drill stem tests of the present invention and shown in assembled relation with a conventional drill pipe disposed within a well bore.

Fig. 2 is an enlarged sectional view showing a conventional drill pipe disposed in operative position within a well bore.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The method practiced by the present invention for conducting drill stem tests comprises generally the steps of running an empty drill pipe into the well bore and positioning a perforated portion thereof adjacent the formation under test; setting a packer or similar seal above the formation or strata under test so as to seal the annular space between the pipe and walls of the well bore and to relieve the pressure of the column of mud surrounding the drill pipe from the sand or other producing strata of the formation under test; and partially evacuating the drill pipe so as to increase the pressure differential between the producing formation and the inside of the drill pipe and thus to effect a flow of fluid from the formation under test into the drill pipe.

More particularly, the provision of the partial vacuum in the drill pipe is effected by the use of mud and a pump therefor which are normally used in the drilling operation of the well and thus will normally be available without additional expense or inconvenience at the well site when it is desired to test the productivity or capacity of a particular formation.

This method may be best described with reference to the drawings showing a simplified version of a well 10 being tested in accordance with the present invention. As shown therein, a drill pipe 20 is positioned in a well bore 10 and has a perforated end portion 22 disposed adjacent the formation or strata 12 to be tested. A packer 24 or similar sealing device is positioned above the producing formation 12, sealing the annular space between the well bore 10 and the drill pipe 20 and supporting the column of mud 30 therein.

The drill pipe 20 is connected at its upper end to a Venturi type jet 40, and a mud pump 50, through a connector 26, a rotary hose 28, a T-fitting 29 and pipes 42 and 52. The latter pipes are provided with a valve 43 and 53 respectively for selectively closing or opening of the lines to the drill pipe 20.

Another pipe 44 is connected to the mud pump 50 through the pipe 52 and extends into the Venturi tube 40 terminating adjacent or just beyond the narrowest portion of the tube 40. The pipe 44 is also provided with a valve 63 for controlling the flow of mud through the Venturi type jet 40.

A mud pump 50 is of conventional design and has an inlet suction pipe 54 extending into a mud pit 55.

A vacuum gauge 45 is provided in the T-fitting 29 which is adapted to read the pressure of the partial vacuum in the drill pipe effected by the Venturi jet during testing of the formation.

In testing a well having a relatively low bottom hole pressure in accordance with the present invention, the drill pipe 20 is run into the well bore 10 so as to position the perforated end portion 22 thereof adjacent the formation 12 to be tested. A packer 24 or similar seal is positioned immediately above the formation 12 to seal the annular space and support the mud 30 above the formation under test.

The mud pump 50 is then operated with the valve 53 closed and the valve 63 open, thus pumping mud 30 in the direction of the arrows 32 and 33 from the mud pit 55 at a high velocity through the Venturi tube 40. This flow of mud effects a lowered pressure or partial vacuum in the upper portion (as shown in Fig. 1) of the Venturi tube 40 such that when the valve 43 is open, the drill pipe 20 is partially evacuated. The air in the pipe 20 is pumped in the direction of the arrows 34, 35 and 36.

This partial vacuum or diminished pressure in the drill pipe draws, by differential pressure, any mud forced into the formation during the drilling operation as well as the fluids from the formation 12 under test into the bore 21 in the drill pipe, much the same as would be accomplished if the well had a relatively high back pressure. The fluid sample rises in the pipe 20 to a height determined by the differential pressure of the system and the average density of the sample. A butterfly valve is provided in the drill pipe just above the perforated section so that the sample is trapped within the pipe. The pipe is then withdrawn and the sample released into a suitable container to allow inspection thereof.

It should be apparent from the foregoing, that the present invention provides an apparatus for testing the productivity and capacity of a well, which apparatus is especially adapted to provide accurate and reliable data from wells having a relatively low bottom hole pressure. The apparatus disclosed herein creates and utilizes a substantial pressure differential between the producing formation and the interior of the drill pipe and thus permits an expulsion of the infiltrated mud in the well bore thus clearing the pores of the formation and allowing the fluid contents of the formation to enter the drill pipe. The method practiced by the above apparatus does not require special or costly equipment in the testing of a well, but instead is adapted to be carried out using conventional drilling equipment, such as the mud pump, which is normally available at a well site during a testing operation.

Having thus described my invention, I claim:

In a well having a drill pipe extending from the surface of the well into the bore hole thereof having an opening adjacent a formation to be tested and a packer on said pipe above said opening, an apparatus for conducting drill stem tests in the well to determine the productivity and capacity of the producing formation thereof and comprising a Venturi tube, a mud pump, mud pipes connecting said mud pump to the top of said drill pipe and said Venturi tube, a valve in each pipe for alternately and selectively controlling the flow of mud to the drill pipe or said Venturi tube, a vacuum pipe connecting the top of said drill pipe with a low pressure area in said Venturi tube, a valve for selectively opening said vacuum pipe when the mud is pumped through said Venturi tube, the mud pipe connecting said mud pump to said Venturi tube extending axially into said tube and terminating adjacent the restriction therein.

References Cited in the file of this patent

UNITED STATES PATENTS

| Number | Name | Date |
| --- | --- | --- |
| 1,933,165 | Curtis | Oct. 31, 1933 |
| 2,115,378 | Wolf | Apr. 26, 1938 |
| 2,187,486 | Burt | Jan. 16, 1940 |
| 2,343,269 | Aaron | Mar. 4, 1944 |
| 2,624,410 | Nixon | Jan. 6, 1953 |